United States Patent
Nakayama

(10) Patent No.: US 12,508,760 B2
(45) Date of Patent: Dec. 30, 2025

(54) INJECTION NOZZLE, INJECTION APPARATUS, AND INJECTION MOLDING MACHINE

(71) Applicant: THE JAPAN STEEL WORKS, LTD., Tokyo (JP)

(72) Inventor: Kiyotaka Nakayama, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 303 days.

(21) Appl. No.: 18/183,001

(22) Filed: Mar. 13, 2023

(65) Prior Publication Data

US 2023/0302703 A1 Sep. 28, 2023

(30) Foreign Application Priority Data

Mar. 14, 2022 (JP) ................................ 2022-038918

(51) Int. Cl.
*B29C 45/17* (2006.01)
*B29C 45/23* (2006.01)
*B29C 45/78* (2006.01)

(52) U.S. Cl.
CPC ............ *B29C 45/78* (2013.01); *B29C 45/231* (2013.01); *B29C 45/17* (2013.01); *B29C 2945/7604* (2013.01); *B29C 2945/7621* (2013.01)

(58) Field of Classification Search
CPC ......... B29C 45/17; B29C 45/20; B29C 45/27; B29C 45/28; B29C 45/74; B29C 45/78; B29C 45/1734; B29C 45/1739
See application file for complete search history.

(56) References Cited

U.S. PATENT DOCUMENTS

| | | | | |
|---|---|---|---|---|
| 3,295,169 A * | 1/1967 | Moslo | ................... | B29C 45/231 425/563 |
| 4,875,845 A * | 10/1989 | Hara | ....................... | B29C 45/20 425/549 |
| 4,886,439 A | 12/1989 | Hehl | | |
| 5,012,839 A * | 5/1991 | Rogers | .................... | B29C 45/28 425/563 |
| 5,118,280 A * | 6/1992 | Gellert | ................ | B29C 45/2737 425/549 |
| 9,616,604 B2 * | 4/2017 | Sakurada | ................ | B29C 45/17 |

(Continued)

FOREIGN PATENT DOCUMENTS

| | | |
|---|---|---|
| JP | 63-252709 A | 10/1988 |
| JP | 1-176533 A | 7/1989 |

(Continued)

OTHER PUBLICATIONS

Office Action dated Sep. 26, 2025 issued by the Japan Patent Office in Japanese Patent Application No. 2022-038918.

*Primary Examiner* — Thu Khanh T. Nguyen
(74) *Attorney, Agent, or Firm* — Sughrue Mion, PLLC

(57) ABSTRACT

An injection nozzle is attachable to a tip end of a heating cylinder and having an in-nozzle flow path formed therein. The injection nozzle is attached to the heating cylinder by being pressed against the heating cylinder by a nozzle pressing member that is fixed to an end surface of a tip end of the heating cylinder. An outer peripheral surface of the injection nozzle has a sensor hole that is opened at a position contacting the nozzle pressing member, and a temperature sensor is inserted into the sensor hole.

17 Claims, 2 Drawing Sheets

(56) References Cited

U.S. PATENT DOCUMENTS

| | | | |
|---|---|---|---|
| 2002/0102323 A1* | 8/2002 | Ihara | ................. B29C 45/27 425/549 |
| 2009/0214693 A1* | 8/2009 | Holliday | ............ B29C 45/2737 425/549 |
| 2010/0175160 A1 | 7/2010 | Arnold | |
| 2015/0298377 A1 | 10/2015 | Sakurada et al. | |

FOREIGN PATENT DOCUMENTS

| | | |
|---|---|---|
| JP | 5-309706 A | 11/1993 |
| JP | 2000-263618 A | 9/2000 |
| JP | 2010-540787 A | 12/2010 |
| JP | 5074976 B2 | 11/2012 |
| JP | 2015-189128 A | 11/2015 |
| JP | 2015-205411 A | 11/2015 |
| JP | 2020-124821 A | 8/2020 |
| JP | 2020-151745 A | 9/2020 |
| JP | 6851703 B1 | 3/2021 |
| JP | 2021-109430 A | 8/2021 |

\* cited by examiner

INJECTION NOZZLE, INJECTION APPARATUS, AND INJECTION MOLDING MACHINE

CROSS-REFERENCE TO RELATED APPLICATIONS

This application is based on and claims priority under 35 USC 119 from Japanese Patent Application No. 2022-038918 filed on Mar. 14, 2022, the entire content of which is incorporated herein by reference.

TECHNICAL FIELD

The present disclosure relates to an injection nozzle provided in an injection molding machine, an injection apparatus including the injection nozzle, and the injection molding machine.

BACKGROUND

An injection nozzle is provided at a tip end of a heating cylinder. A tip end of the injection nozzle is configured to touch a mold, and the injection nozzle is configured to inject melt resin. In the injection nozzle, a shut-off nozzle may be configured by an injection nozzle and a needle valve provided obliquely with respect to the injection nozzle, as described in JPH1-176533A, for example. The shut-off nozzle can open and close an in-nozzle flow path formed in the injection nozzle by moving the needle valve forward and backward. The shut-off nozzle can prevent resin from leaking when a tip end of the injection nozzle is separated from the mold, that is, so-called drooling.

SUMMARY

The heating cylinder is divided into a plurality of zones in a length direction, and a plurality of heaters are provided so as to correspond to the respective zones. A plurality of holes are opened in an outer peripheral surface of the heating cylinder, and temperature sensors are respectively provided in the holes, so that a resin temperature can be measured. Therefore, the temperature can be controlled such that the resin has a desired temperature in each zone.

Similarly, a heater is also provided on the injection nozzle, and a temperature sensor is also embedded therein. However, a position where the temperature sensor is provided in the injection nozzle is relatively near a tip end portion of the injection nozzle. Therefore, the temperature can be controlled in the injection nozzle, but the temperature being controllable is limited to a portion near the tip end portion. On the other hand, since a rear end portion of the injection nozzle is attached to the heating cylinder, a temperature of the injection nozzle may be appropriately controlled if a temperature of the heating cylinder is controlled. However, in practice, there is a problem that the temperature decreases in the vicinity of the rear end portion of the injection nozzle. Accordingly, pressure loss of resin may occur during injection due to a decrease in fluidity of the resin, and voids may occur in a molded product. Particularly, this problem is likely to occur in a shut-off nozzle where it is difficult to provide a heater in the vicinity of the rear end portion of the injection nozzle.

The present disclosure provides an injection nozzle that can accurately control a resin temperature, an injection apparatus including such an injection nozzle, and an injection molding machine.

Other problems and novel characteristics will become apparent from the description of this specification and the accompanying drawings.

An injection nozzle is attachable to a tip end of a heating cylinder. An in-nozzle flow path is formed in the injection nozzle. In the present disclosure, the injection nozzle is attached to the heating cylinder by being pressed against the heating cylinder by a nozzle pressing member that is fixed to an end surface of the tip end of the heating cylinder. A sensor hole is opened in an outer peripheral surface, of the injection nozzle, in contact with the nozzle pressing member, and a temperature measurement unit is inserted into the sensor hole.

In the present disclosure, a resin temperature can be accurately controlled in an injection nozzle.

DETAILED DESCRIPTION

Figure 1:
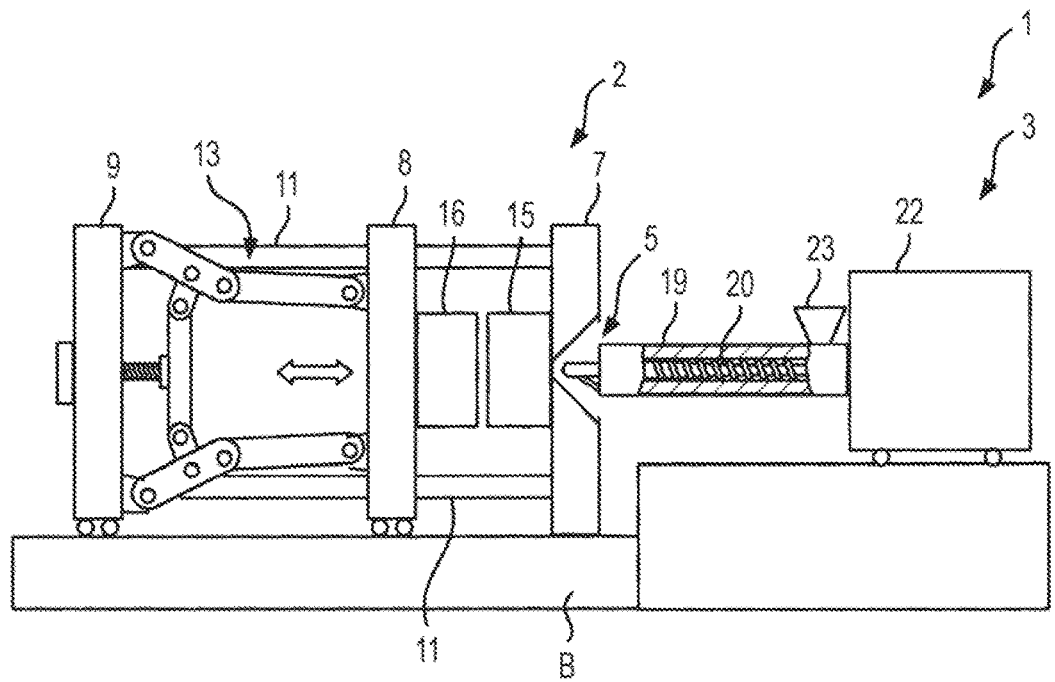
FIG. 1 is a front view showing an injection molding machine according to the present illustrative embodiment.

Hereinafter, illustrative embodiments will be described in detail with reference to the drawings. However, the present disclosure is not limited to the following illustrative embodiments. In order to clarify the description, the following description and the drawings are simplified as appropriate. In the drawings, the same elements are denoted by the same reference numerals, and repeated description thereof is omitted as necessary. Further, hatching is omitted in some parts so as not to complicate the drawings.

The present illustrative embodiment will be described.
{Injection Molding Machine}

As shown in FIG. 1, an injection molding machine 1 according to the present illustrative embodiment includes a toggle-type mold clamping device 2 and an injection apparatus 3. A shut-off nozzle 5 according to the present illustrative embodiment is provided in the injection apparatus 3 according to the present illustrative embodiment, and details thereof will be described later.
{Mold Clamping Device}

The mold clamping device 2 includes a fixed platen 7 fixed to a bed B, a movable platen 8 provided on the bed B in a slidable manner, and a mold clamping housing 9. The fixed platen 7 and the mold clamping housing 9 are coupled to each other by a plurality of tie bars 11, 11 . . . , and the movable platen 8 is slidable between the fixed platen 7 and the mold clamping housing 9. A mold clamping mechanism is provided between the mold clamping housing 9 and the movable platen 8. In the present illustrative embodiment, a toggle mechanism 13 is provided between the mold clamping housing 9 and the movable platen 8. A mold 15 on a fixed side and a mold 16 on a movable side are provided on the fixed platen 7 and the movable platen 8, respectively. Therefore, the molds 15 and 16 are opened and closed when the toggle mechanism 13 is driven.

{Injection Apparatus}

The injection apparatus 3 includes a heating cylinder 19, a screw 20 provided in the heating cylinder 19, and a screw driving device 22. The heating cylinder 19 is supported by the screw driving device 22. The screw 20 is driven by the screw driving device 22 in a rotational direction and an axial direction. The heating cylinder 19 is provided with a hopper 23 and the shut-off nozzle 5 according to the present illustrative embodiment, which will be described later. When resin is supplied from the hopper 23, the heating cylinder 19 is heated, and the screw 20 is rotated by the screw driving device 22, the resin is melted and weighed. The resin can be injected into the molds 15 and 16 by the screw 20 being driven in the axial direction by the screw driving device 22.

{Shut-Off Nozzle According to Present Illustrative Embodiment}

Figure 2:
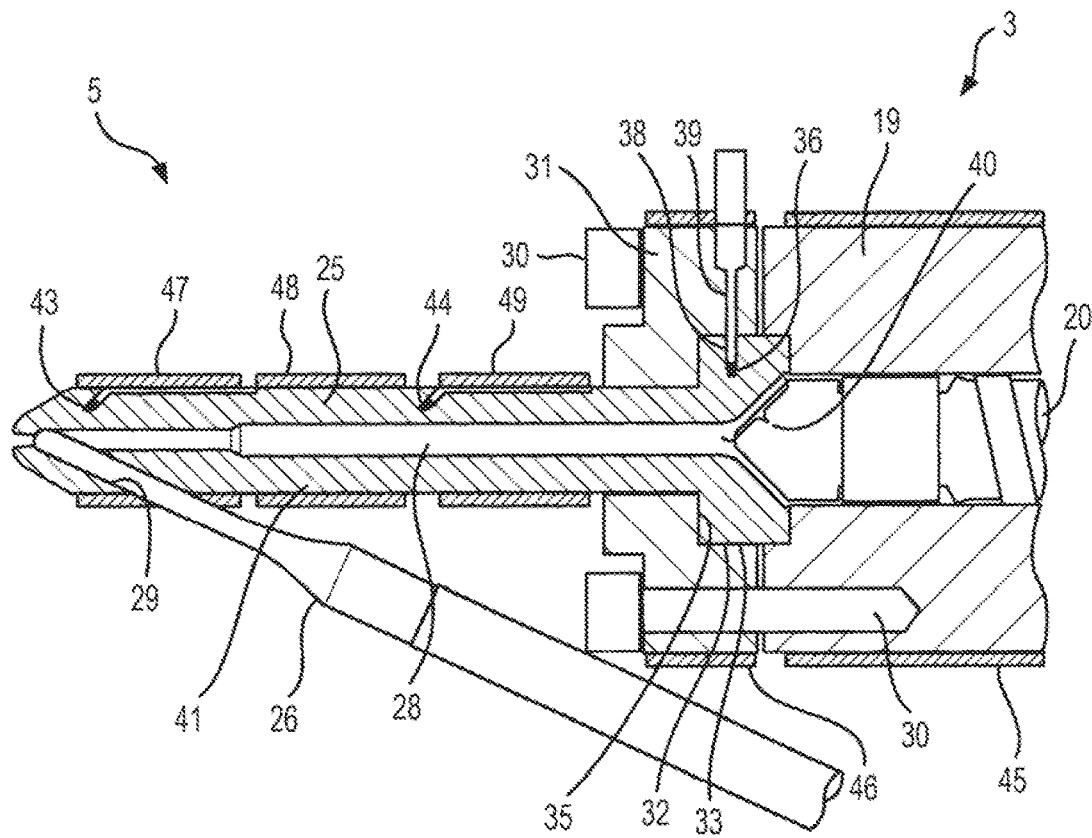
FIG. 2 is a front cross-sectional view showing a shut-off nozzle and a part of an injection apparatus according to the present illustrative embodiment.

As shown in FIG. 2, the shut-off nozzle 5 according to the present illustrative embodiment includes an injection nozzle 25 and a needle valve 26. The injection nozzle 25 according to the present illustrative embodiment includes a plurality of structures different from those of related-art injection nozzles, and those structures will be described in detail. Meanwhile, there is also a part configured similarly to that of the related-art injection nozzle of the shut-off nozzle. That is, an in-nozzle flow path 28 through which the resin flows is formed in the injection nozzle 25. A needle hole 29 that extends from an outer peripheral surface to the in-nozzle flow path 28 is opened. The needle valve 26 is housed in the needle hole 29 so as to be movable forward and backward, and is driven by a driving mechanism (not shown). Therefore, when the needle valve 26 is moved forward and backward, the in-nozzle flow path 28 is opened and closed.

In this way, the shut-off nozzle 5 according to the present illustrative embodiment employs a type in which the needle valve 26 is inserted into the injection nozzle 25 from an outside obliquely with respect to the injection nozzle 25. Therefore, there is little structure that interferes with provision of a heater around the injection nozzle 25. The heater will be described in the following description, but can be appropriately disposed in the injection nozzle 25 or the like. That is, although the shut-off nozzle 5 according to the present illustrative embodiment includes the shut-off valve, the shut-off nozzle 5 is of a type having less restriction in providing the heater.

{Injection Nozzle}

The injection nozzle 25 according to the present illustrative embodiment is characterized by an attachment method for attaching the injection nozzle 25 to the heating cylinder 19. The injection nozzle 25 is attached by a nozzle pressing member 31, as shown in FIG. 2. A characteristic structure is formed on an upstream side, that is, at a rear end portion of the injection nozzle 25 such that the injection nozzle 25 is attached by the nozzle pressing member 31. Specifically, a flange portion 32 having an enlarged diameter is formed, and an outer peripheral surface 33 of the flange portion 32 is a smooth cylindrical surface. That is, the outer peripheral surface 33 is not formed as a male screw. A step portion 35 is formed in the nozzle pressing member 31. The flange portion 32 is housed by the step portion 35. The nozzle pressing member 31 is fastened to the heating cylinder 19 by a plurality of bolts 30, 30, . . . , whereby the injection nozzle 25 is pressed against the heating cylinder 19.

Since the injection nozzle 25 is attached to the heating cylinder 19 in this way, the injection nozzle 25 can be fixed to the heating cylinder 19 while being adjusted to a desired rotational position. Since the rotational position can be adjusted, a temperature measurement unit, that is, a rear end portion temperature sensor 36 can be provided at the rear end portion of the injection nozzle 25. That is, in the injection nozzle 25, a sensor hole 38 is opened at a predetermined depth from the outer peripheral surface 33 of the flange portion 32. A through hole 39 is opened in the nozzle pressing member 31. The injection nozzle 25 is attached to the heating cylinder 19 with adjusting the rotational position such that the through hole 39 and the sensor hole 38 are aligned with each other, and the rear end portion temperature sensor 36 is inserted into the through hole 39 and the sensor hole 38.

Incidentally, the rear end portion temperature sensor 36 is configured to measure a temperature of the rear end portion of the injection nozzle 25, that is to say, the rear end portion temperature sensor 36 is configured to measure a temperature of the resin that flows in the in-nozzle flow path 28. A flow path cross-sectional area of the in-nozzle flow path 28 changes at several locations in a flow direction. As indicated by a reference numeral 40, the rear end portion temperature sensor 36 is located in the vicinity of a portion where a reduction rate of the flow path cross-sectional area is the largest. That is, a resin temperature at the location of the reference numeral 40 is measured. When the resin flows, a temperature is more likely to rise at a location where the flow path cross-sectional area is significantly reduced than at other locations. Since the temperature can be measured in the vicinity of such a reference numeral 40, the resin temperature can be accurately controlled.

Another characteristic of the injection nozzle 25 according to the present illustrative embodiment is that the injection nozzle 25 is formed of a single member. That is, the injection nozzle 25 is not assembled from a plurality of members. Therefore, the in-nozzle flow path 28 is formed smoothly, so that the flow of the resin is not disturbed. Still another characteristic of the injection nozzle 25 according to the present illustrative embodiment is that a nose portion 41 is longer than that of a related-art injection nozzle. Specifically, a ratio L/D of a length L of the nose portion 41 to a diameter D of the nose portion 41 is 4.0 or more. This is also a structure for adjusting the flow of the resin in the in-nozzle flow path 28. In this way, since the injection nozzle 25 according to the present illustrative embodiment has a structure in which the resin smoothly flows, pressure loss during injection is small. Therefore, it is possible to reduce occurrence of voids.

First and second nose portion temperature sensors 43 and 44 are embedded in the nose portion 41 of the injection nozzle 25. Accordingly, it is possible to measure resin temperatures of a vicinity of a tip end portion and a central portion of the injection nozzle 25.

{Heater}

Heaters 45, 46, and so on are provided in the injection apparatus 3 according to the present illustrative embodiment as follows. First, the heating cylinder heater 45 is provided on an outer peripheral surface of the heating cylinder 19. Although only one heating cylinder heater 45 is shown in FIG. 2, a plurality of heating cylinder heaters 45 are provided in a length direction of the heating cylinder 19.

Next, the nozzle pressing member heater 46 is provided on an outer peripheral surface of the nozzle pressing member 31. The nozzle pressing member heater 46 is independent of the heating cylinder heater 45. The nozzle pressing member heater 46 is configured to heat the nozzle pressing member 31 only. The rear end portion of the injection nozzle 25 is heated by heat conduction from the nozzle pressing member 31. However, since these are separate members, the temperature of the rear end portion of the injection nozzle 25 tends to be low. That is, it can be said that the vicinity of the rear end portion of the injection nozzle 25 is a location where heat is easily dissipated, and is a location where the resin temperature is lowered, viscosity is increased, and pressure loss during the injection is likely to occur. However, in the present illustrative embodiment, as described above, the temperature of the rear end portion of the injection nozzle 25 can be directly measured by the rear end portion temperature sensor 36, and the nozzle pressing member 31 can be heated independently of the heating cylinder 19 by the nozzle pressing member heater 46. Therefore, the temperature of the rear end portion of the injection nozzle 25 can be accurately controlled to a desired temperature.

First to third nose portion heaters 47, 48, and 49 are provided on the nose portion 41 of the injection nozzle 25. In this way, the injection nozzle 25 according to the illustrative embodiment is provided with the plurality of temperature sensors 36, 43, and 44 and the plurality of heaters 46, 47, and so on. Therefore, the injection nozzle 25 according to the illustrative embodiment can accurately control the resin temperature in the in-nozzle flow path 28. Therefore, a decrease in fluidity generated by the decrease in the resin temperature and the pressure loss of the resin due to the decrease in the fluidity are unlikely to occur. That is, it is possible to reduce the occurrence of the voids.

{Related-Art Shut-Off Nozzle}

Figure 3:
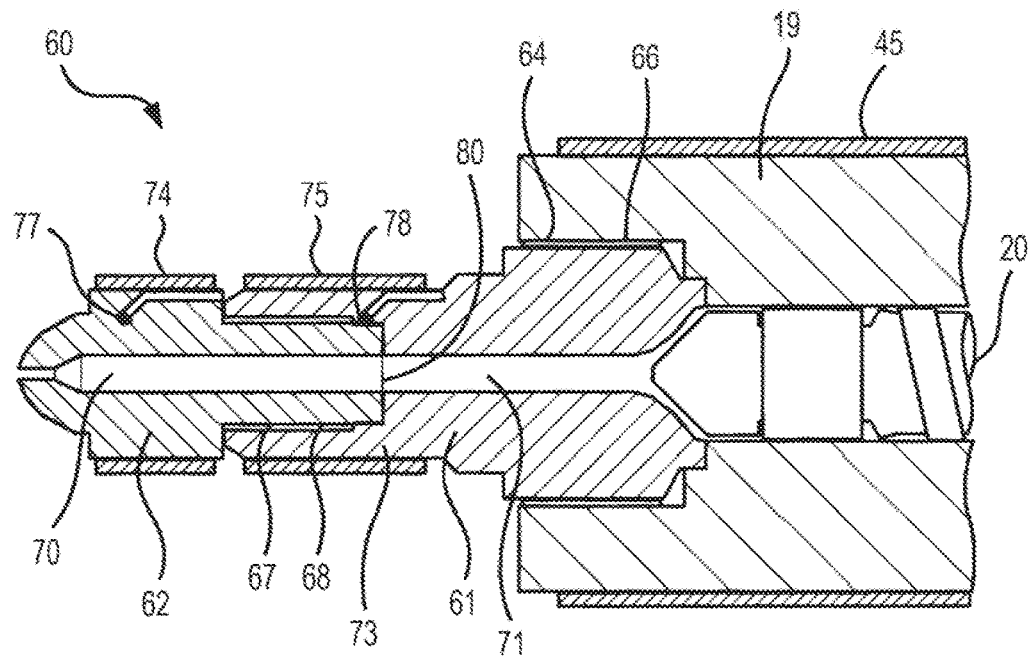
FIG. 3 is a front cross-sectional view showing a related-art injection nozzle and a part of an injection apparatus.

In order to compare with the shut-off nozzle 5 according to the present illustrative embodiment, a related-art injection nozzle 60 shown in FIG. 3 will be described. The injection nozzle 60 is configured by an injection nozzle main body portion 61 and a nozzle tip 62. A male screw 64 is formed at a rear end portion on an upstream side in the injection nozzle main body portion 61. A female screw 66 is formed at a tip end of the heating cylinder 19, and the male screw 64 is screwed to the female screw 66, so that the injection nozzle main body portion 61 is attached. A female screw 67 is formed at the tip end of the injection nozzle main body portion 61. A male screw 68 is formed at a rear end portion of the nozzle tip 62. The nozzle tip 62 is provided in the injection nozzle main body portion 61 by screwing the male screw 68 to the female screw 67.

First and second in-nozzle flow paths 70 and 71 are respectively formed in the nozzle tip 62 and the injection nozzle main body portion 61, and these flow paths are continuous with each other. In order to heat resin that flows in the first and second in-nozzle flow paths 70 and 71, first and second nozzle heaters 74 and 75 and first and second temperature sensors 77 and 78 are provided at a nose portion 73 of the injection nozzle 60. The heating cylinder heater 45 is provided on the heating cylinder 19, so that the heating cylinder 19 is heated, and a rear end portion of the injection nozzle 60 is indirectly heated.

In the related-art injection nozzle 60, a temperature sensor is not provided in the rear end portion. Therefore, a resin temperature of a vicinity of the rear end portion cannot be measured, and the temperature cannot be accurately controlled. Further, although the rear end portion of the injection nozzle 60 is heated by heat conduction from the heating cylinder 19, since the injection nozzle main body portion 61 and the heating cylinder 19 are formed of separate members, a temperature of the injection nozzle main body portion 61 is unlikely to rise. Therefore, a resin temperature in the second in-nozzle flow path 71 is likely to decrease. Further, in the related-art injection nozzle 60, since the injection nozzle 60 is configured by two members including the injection nozzle main body portion 61 and the nozzle tip 62, a seam 80 is formed at the first and second in-nozzle flow paths 70 and 71. The seam 80 may become a factor that disturbs flow of the resin, and may cause a pressure loss during injection. As have been described above, the injection nozzle 25 of the shut-off nozzle 5 (see FIG. 2) according to the present illustrative embodiment solves these problems.

{Injection Nozzle According to Second Illustrative Embodiment}

Figure 4:
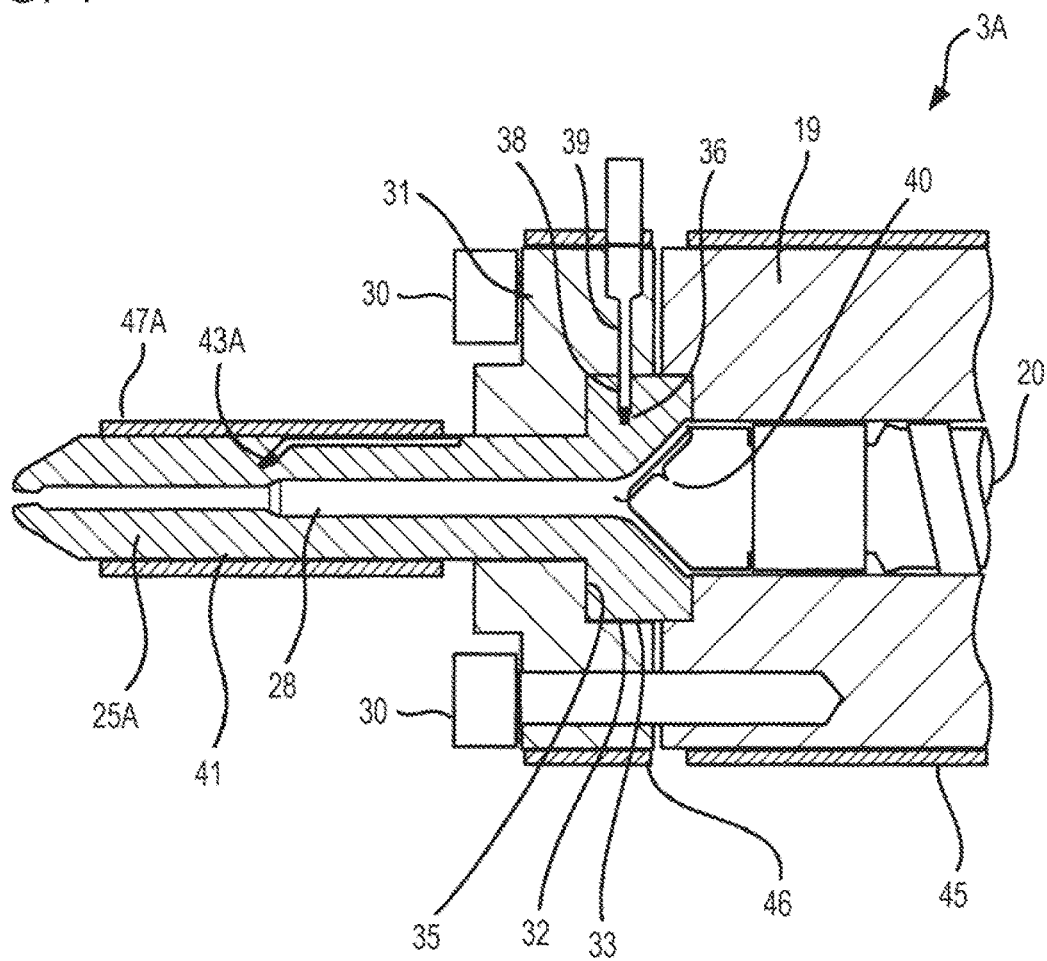
FIG. 4 is a front cross-sectional view showing an injection nozzle and a part of an injection apparatus according to a second illustrative embodiment.

Various modifications can be made for the present illustrative embodiment. For example, the present disclosure can also be applied to an injection nozzle not including the shut-off valve. FIG. 4 shows an injection apparatus 3A according to the second illustrative embodiment including an injection nozzle 25A according to the second illustrative embodiment. Members similar to those of the first illustrative embodiment are denoted by the same reference numerals, and description thereof will be omitted. Also in the injection nozzle 25A according to the second illustrative embodiment, the rear end portion temperature sensor 36 is provided in a rear end portion of the injection nozzle 25A, and a resin temperature is measured at a location where a change rate of a flow path cross-sectional area of the in-nozzle flow path 28 is high, as indicated by the reference numeral 40. The nozzle pressing member 31 is provided with the nozzle pressing member heater 46. Accordingly, a temperature can be appropriately controlled. Further, since the injection nozzle 25A is also formed of a single member, the flow of the resin is smooth in the in-nozzle flow path 28, and no pressure loss occurs.

In this illustrative embodiment, only one heater, that is, a nose portion heater 47A, and only one temperature sensor, that is, a nose portion temperature sensor 43A are provided at the nose portion 41. However, a resin temperature in the nose portion 41 can be controlled to be substantially uniform.

Although the invention made by the present inventors is specifically described based on the illustrative embodiments, it is needless to say that the present invention is not limited to the illustrative embodiments described above, and various modifications can be made without departing from the gist of the invention. A plurality of examples described above may be implemented in combination as appropriate.

What is claimed is:

1. An injection nozzle attachable to a tip end of a heating cylinder and comprising:
   an in-nozzle flow path formed therein,
   wherein the injection nozzle is attached to the heating cylinder by being pressed against the heating cylinder by a nozzle pressing member, the nozzle pressing member being fixed to an end surface of a tip end of the heating cylinder,
   wherein an outer peripheral surface of the injection nozzle has a sensor hole, the sensor hole being opened in the outer peripheral surface of the injection nozzle at a position contacting the nozzle pressing member, and wherein a temperature sensor is inserted into the sensor hole,
   wherein a flow path cross-sectional area of the in-nozzle flow path changes at several locations in a flow direction, and
   wherein the temperature sensor is configured to measure a resin temperature at a portion where a reduction rate of the flow path cross-sectional area in the flow direction of the in-nozzle flow path is highest.

2. The injection nozzle according to claim 1,
wherein the injection nozzle is one component of a shut-off nozzle that is configured by the injection nozzle and a needle valve,
wherein the injection nozzle has a needle hole, the needle hole being opened in the injection nozzle and extending from an outer peripheral surface to the in-nozzle flow path, and
wherein the needle valve is inserted into the needle hole so as to be movable forward and backward and to open and close the in-nozzle flow path.

3. The injection nozzle according to claim 1, wherein the injection nozzle comprises a nose portion at a downstream side of the injection nozzle and a flange portion on an end portion of the injection nozzle on an upstream side, an outer peripheral surface of the flange portion being enlarged in a diameter compared to the nose portion,
wherein the flange portion is configured to be pressed by the nozzle pressing member, and
wherein the sensor hole is opened in the outer peripheral surface of the flange portion.

4. The injection nozzle according to claim 3, wherein the outer peripheral surface of the flange portion is formed as a smooth cylindrical surface.

5. The injection nozzle according to claim 1, wherein the injection nozzle is formed of a single member, and the in-nozzle flow path is seamlessly formed.

6. An injection apparatus comprising:
a heating cylinder;
a screw housed in the heating cylinder; and
an injection nozzle attached to a tip end of the heating cylinder and having an in-nozzle flow path formed therein,
wherein the injection nozzle is attached to the heating cylinder by being pressed against the heating cylinder by a nozzle pressing member, the nozzle pressing member being fixed to an end surface of a tip end of the heating cylinder,
wherein an outer peripheral surface of the injection nozzle has a sensor hole, the sensor hole being opened in the outer peripheral surface of the injection nozzle at a position contacting the nozzle pressing member, and
wherein a temperature sensor is inserted into the sensor hole via a through hole that is opened in the nozzle pressing member,
wherein a flow path cross-sectional area of the in-nozzle flow path changes at several locations in a flow direction, and
wherein the temperature sensor is configured to measure a resin temperature at a portion where a reduction rate of the flow path cross-sectional area in the flow direction of the in-nozzle flow path is highest.

7. The injection apparatus according to claim 6, wherein an outer peripheral portion of the nozzle pressing member is provided with a nozzle pressing member heater.

8. The injection apparatus according to claim 6,
wherein the injection nozzle is one component of a shut-off nozzle that is configured by the injection nozzle and a needle valve,
wherein the injection nozzle has a needle hole, the needle hole being opened in the injection nozzle and extending from an outer peripheral surface to the in-nozzle flow path, and
wherein the needle valve is inserted into the needle hole so as to be movable forward and backward and to open and close the in-nozzle flow path.

9. The injection apparatus according to claim 6,
wherein the injection nozzle comprises a nose portion at a downstream side of the injection nozzle and a flange portion on an end portion of the injection nozzle on an upstream side, an outer peripheral surface of the flange portion being enlarged in a diameter compared to the nose portion,
wherein the flange portion is configured to be pressed by the nozzle pressing member, wherein the outer peripheral surface of the flange portion is formed as a smooth cylindrical surface, and
wherein the sensor hole is opened in the outer peripheral surface of the flange portion.

10. The injection apparatus according to claim 6, wherein the injection nozzle is formed of a single member, and the in-nozzle flow path is seamlessly formed.

11. An injection molding machine comprising:
a mold clamping device; and
an injection apparatus comprising:
a heating cylinder;
a screw housed in the heating cylinder; and
an injection nozzle attached to a tip end of the heating cylinder and having an in-nozzle flow path formed therein;
wherein the injection nozzle is attached to the heating cylinder by being pressed against the heating cylinder by a nozzle pressing member, the nozzle pressing member being fixed to an end surface of a tip end of the heating cylinder,
wherein an outer peripheral surface of the injection nozzle has a sensor hole, the sensor hole being opened in the outer peripheral surface of the injection nozzle at a position contacting the nozzle pressing member,
wherein a temperature sensor is inserted into the sensor hole via a through hole that is opened in the nozzle pressing member,
wherein a flow path cross-sectional area of the in-nozzle flow path changes at several locations in a flow direction, and
wherein the temperature sensor is configured to measure a resin temperature at a portion where a reduction rate of the flow path cross-sectional area in the flow direction of the in-nozzle flow path is highest.

12. The injection molding machine according to claim 11, wherein an outer peripheral portion of the nozzle pressing member is provided with a nozzle pressing member heater.

13. The injection molding machine according to claim 11,
wherein the injection nozzle is one component of a shut-off nozzle that is configured by the injection nozzle and a needle valve,
wherein the injection nozzle has a needle hole, the needle hole being opened in the injection nozzle and extending from an outer peripheral surface to the in-nozzle flow path, and
wherein the needle valve is inserted into the needle hole so as to be movable forward and backward and to open and close the in-nozzle flow path.

14. The injection molding machine according to claim 11,
wherein the injection nozzle comprises a nose portion at a downstream side of the injection nozzle and a flange portion on an end portion of the injection nozzle on an upstream side, an outer peripheral surface of the flange portion being enlarged in a diameter compared to the nose portion, wherein the flange portion is configured to be pressed by the nozzle pressing member, wherein the outer peripheral surface of the flange portion is formed as a smooth cylindrical surface, and wherein the sensor hole is opened in the outer peripheral surface of the flange portion.

15. The injection molding machine according to claim 11, wherein the injection nozzle is formed of a single member, and the in-nozzle flow path is seamlessly formed.

16. The injection apparatus according to claim 6, wherein the nozzle pressing member includes a through hole aligned with the sensor hole in the injection nozzle, and the temperature sensor is inserted into the through hole and the sensor hole.

17. The injection molding machine according to claim 11, wherein the nozzle pressing member includes a through hole aligned with the sensor hole in the injection nozzle, and the temperature sensor is inserted into the through hole and the sensor hole.

* * * * *